United States Patent
Sich et al.

(10) Patent No.: US 6,878,091 B2
(45) Date of Patent: Apr. 12, 2005

(54) INFINITELY VARIABLE FRICTION GEAR

(75) Inventors: Berhard Sich, Friedrichshafen (DE); Axel Matheis, Sauldorf (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 123 days.

(21) Appl. No.: 10/332,446

(22) PCT Filed: Jul. 10, 2001

(86) PCT No.: PCT/EP01/07917

§ 371 (c)(1),
(2), (4) Date: Jan. 8, 2003

(87) PCT Pub. No.: WO02/06706

PCT Pub. Date: Jan. 24, 2002

(65) Prior Publication Data

US 2003/0148849 A1 Aug. 7, 2003

(30) Foreign Application Priority Data

Jul. 15, 2000 (DE) .......................... 100 34 453

(51) Int. Cl.⁷ ............................................ F16H 15/38
(52) U.S. Cl. ............................ 476/46; 476/40; 476/42; 476/67
(58) Field of Search ............................ 476/40, 42, 46, 476/67

(56) References Cited

U.S. PATENT DOCUMENTS

| | | | |
|---|---|---|---|
| 4,428,246 A | * 1/1984 | Horton et al. | ................ 476/41 |
| 5,607,372 A | 3/1997 | Lohr | ........................... 475/216 |
| 5,820,512 A | 10/1998 | Nakano | ........................ 476/10 |
| 5,971,886 A | 10/1999 | Yamamoto | .................... 476/10 |
| 6,155,953 A | 12/2000 | Oshidari | ....................... 476/10 |
| 6,402,657 B1 | 6/2002 | Sich | ........................... 476/42 |
| 6,740,001 B1 | * 5/2004 | Ishikawa et al. | .............. 476/42 |
| 6,752,735 B2 | * 6/2004 | Ishikawa et al. | ............. 475/216 |

FOREIGN PATENT DOCUMENTS

| | | | | |
|---|---|---|---|---|
| DE | 197 06 287 A1 | 11/1997 | .......... | F16H/15/40 |
| DE | 197 47 694 A1 | 5/1998 | .......... | F16H/15/38 |
| DE | 197 54 725 A1 | 6/1999 | .......... | F16H/15/38 |
| DE | 198 26 057 A1 | 12/1999 | .......... | F16H/15/38 |
| DE | 199 27 268 A1 | 1/2000 | .......... | F16H/15/38 |
| EP | 0 540 499 A2 | 5/1993 | .......... | F16H/15/38 |
| EP | 1 048 878 A1 | 11/2000 | .......... | F16H/15/38 |

* cited by examiner

*Primary Examiner*—David M. Fenstermacher

(57) ABSTRACT

The invention relates to an infinitely variable friction gear with several frictional wheels which are to transmit via the driving power. The frictional wheels are rotationally mounted in combined axial-radial-bearings (2), which comprises split bearings (3) which are inserted into the supports (4) for the friction wheels (1) and which are rotated at an pivoting axis angle ($\alpha$) in relation to angle Y. The opposite-lying supports of each gear unit are connected to each other by an upper coupling rod (6) and a lower coupling coupling rod (7).

3 Claims, 3 Drawing Sheets

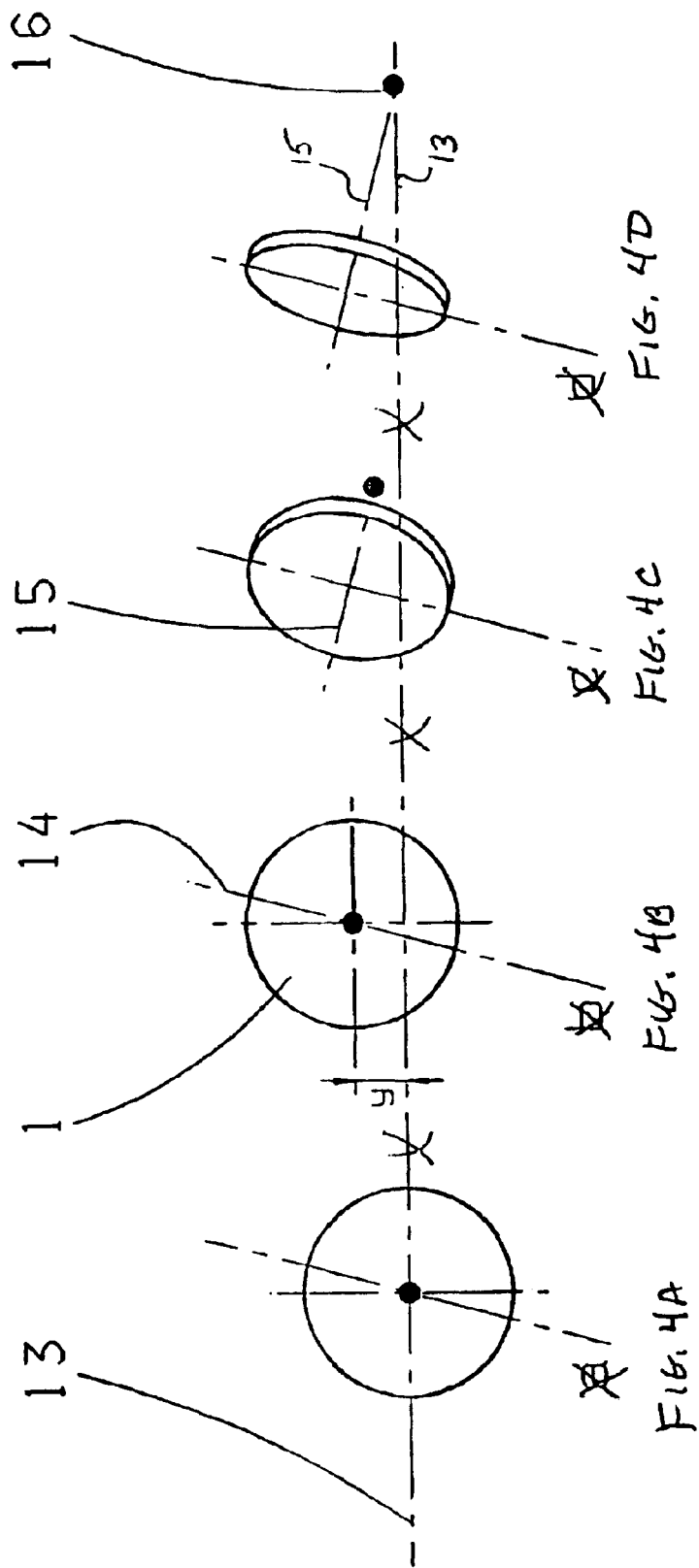

INFINITELY VARIABLE FRICTION GEAR

According to the preamble of claim 1 this invention relates to an infinitely variable friction gear.

Such an infinitely variable friction gear usually has input and output discs disposed coaxially in relation to a common shaft., which are arranged in pairs relative each other and have toroidal inner surfaces, the same as friction wheels situated between the pairs of input and output discs. Said friction wheels are in frictional contact both with the input discs and with the output discs and by frictional contact transmit torque transmitted to them by the input disc to the output disc, the rotational speed of the friction wheels being higher the greater the distance is between their contact points with the input disc and the axis of rotation. The rotational speed of the output disc, on the other hand, is higher the nearer the contact point between friction wheel and output disc is to the axis of rotation. By swinging the friction wheels, it is accordingly possible to adjust infinitely and arbitrarily the rotational speed of the output disc. To this end, the axes of rotation of the friction wheels are each mounted on a carrier controllable via a pivoting device.

A continuously variable friction gear, according to the preamble, has been described in the Applicant's DE A 197 54 725. Said gear has one input shaft which is connected with a torque converter or a wet-running starting clutch of a prime mover of a motor vehicle and is provided with two gear units positioned coaxially in relation to the input shaft. The input discs and the output discs are supported on a torque shaft slightly displaceable in an axial direction relative to the input shaft. Both input discs are here non-rotatably but axially slidingly supported on the torque shaft. A roller-shaped pressure device is supported displaceably in the axial direction upon the input shaft and non-rotatably connected therewith, energizing one of the input discs in the axial direction toward the appertaining output disc. The upper ends of the carriers, which bear the friction wheels, engage with two recesses in the housing where they are rotatably supported while their lower ends engage with recesses in a corresponding fixture, specially with intercalation of a hydraulic piston in a manner such that upon adequate energizing of the piston upper side or of the piston lower side, a light lifting or lowering of the corresponding carrier takes place, the displacement path usually amounting to about 2 mm. The friction wheels proper are inserted in recesses in the carriers and eccentrically supported therein, an eccentric section penetrates the appertaining carrier and the other eccentric section carries one of the friction wheels. Said eccentric support serves for the axial compensating movement of the friction wheels in the longitudinal direction of the gear; the compensating movement of the eccentric makes possible a follow-up of the friction wheels in case of an elastic distortion of the input or output discs, said compensating movement at the same time describes a circular path. But this eccentric support demands a high construction expenditure with an accompanying great support requirement, it being possible, due to the circular compensating movement of the eccentric, that control errors occur which determine undesired reduction ratios.

Since, in these continuously variable friction gears, the ratio is adjusted by displacing the friction wheels tangentially in relation to the gear axis, swiveling forces of the input and output discs can also act upon the torque transmission. In the continuously variable friction gears known already, the friction wheel is positioned in each gear unit so that its pivoting axis is situated in the center of the torus formed by the appertaining input and output discs.

At the points of contact of the friction wheel with the appertaining input disc or output disc, so-called normal forces are produced during adjustment of the ratio. In order that the torque thereby implied that appears on the friction wheel does not produce any undesired change in the gear ratio, it has already been proposed in Applicant's DE A 198 26 057 that for control of the ratio the difference of the normal forces acting upon each wheel due to the pressure forces of the appertaining output disc and input disc be compensated by producing a control force whereby, when the friction wheel is axially retained, said control force that leads to rotation of the friction wheel as applicable to one of the two appertaining discs, while when one of the discs is fixed, said control force can act upon the friction wheel.

By displacing the friction wheels vertically in relation to the longitudinal axis of the continuously variable friction gear, swiveling forces act upon the friction wheels. To keep a ratio that has been adjusted constant, the axes of rotation of the friction wheels and the longitudinal axis of the continuously variable gear have to intersect. This stable condition, which corresponds to a constant ratio, can be obtained in the traditional continuously variable friction gears only in one position of the corresponding friction wheel (Y=0), that is, in an unmoved state. In all other positions of the friction wheels, the swiveling forces act upon them.

The problem on which this invention is based is to provide a continuously variable friction gear in which the input power is guided via several friction wheels, which has a uniform power distribution and thus an exactly equal ratio position of all power branches with improved adjustment behavior regarding stability and load compensation so that the control input is considerably simplified.

Based on a continuously variable friction gear of the kind specifically mentioned above, this problem is solved with the features stated in the characteristic part of claim 1; advantageous developments are described in the sub-claims.

It is, therefore, provided according to the invention that the friction wheels be rotatably supported by combined axial-radial bearings which consist of split bearings inserted in the carriers and rotatable around a provided pivot angle, that the carriers of each gear unit lying opposite each other be interconnected by an upper coupling rod and a lower coupling beam and that the lower coupling rod be supported axially by the housing for the hydraulic pistons.

The carriers are advantageously connected with the upper coupling rod and with the lower coupling beam, via roller bearings. Between the hydraulic piston and the lower end of the carrier, a compensating arrangement can preferably be provided.

The inventive arrangement of the friction wheels in the combined axial-radial bearings and the arrangement of the coupling rods and coupling beams make possible a direct coordination of the deflecting path to the pivot angle at a constant reduction ratio so that, on one hand, the control expense is reduced and, on the other, a better load compensation is obtained between the individual power branches.

The invention is based on the knowledge that all friction wheels must be in a stable state in order to maintain a ratio that has been adjusted constant, that is that the axes of rotation of the friction wheels and the longitudinal axis of the gear must have a common intersection point. The inventive development of the friction gear makes possible that the friction wheel occupy a stable state in every Y position thereof.

The invention is explained in detail herebelow with reference to the drawing where an advantageous embodiment is shown. The drawing shows:

FIG. 4 is a diagrammatic representation of different positions of a friction wheel to explain the mode of operation of the pivot angle.

Since the expert is quite familiar with continuously variable friction gears, herebelow only the parts and operation thereof needed for understanding the invention are described.

Figure 1:
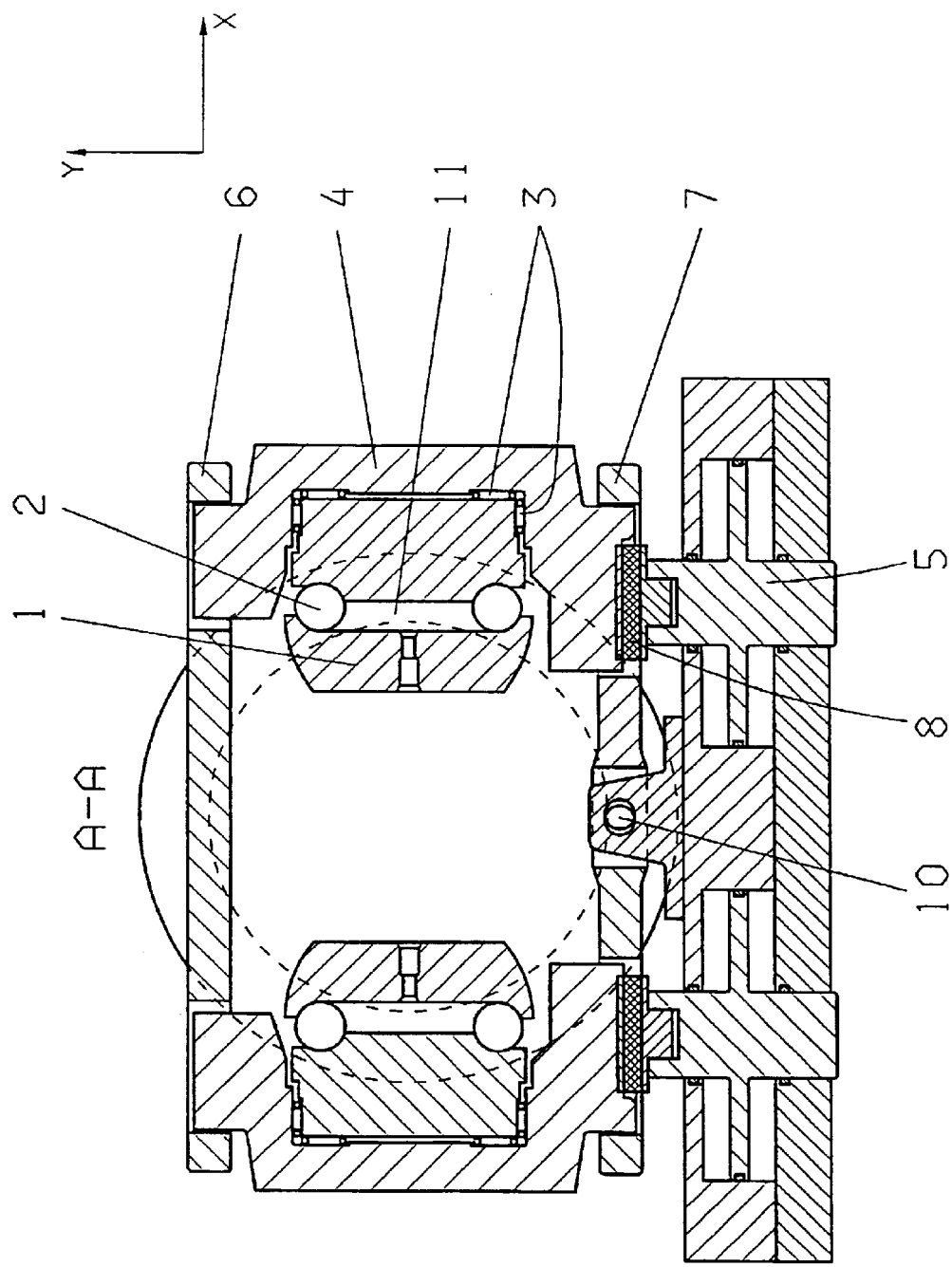
FIG. 1 is a radial section through a gear unit of a continuously variable friction gear.

As can be seen from the radial section in the Y-X plane through a gear unit of a continuously variable friction shown in FIG. 1, the friction wheels 1 are rotatably supported by combined axial-radial bearings 2. The rotation of the friction wheels 1 that is needed for ratio adjustment takes place by means of said axial-radial bearings which consist of two split bearings 3 inserted in corresponding recesses in the carriers 4 and form an angle of 90°. The forces for torque support are applied by the hydraulic pistons 5 to the lower end of the carriers 4.

For support of the reaction forces generating from the semi-toroidal shape, each of the two carriers facing each other are interconnected by an upper coupling rod 6 and a lower coupling beam 7, the carriers 4 being tied to said two connecting elements 6, 7 by specially designed bearing points (not shown) with relative rolling movement.

To compensate for elastic distortion of the parts produced by compression of the input and output discs, compensating arrangements 8 are provided between the hydraulic piston 5 and the carrier 4 which allow only relative movements perpendicular to the movement of the hydraulic piston 5.

The ratio is adjusted by deflecting the friction wheels in the Y direction. The friction wheels 1 are thereby moved out of the stable state so that tipping forces act upon them which cause the friction wheels to rotate.

Figure 2:
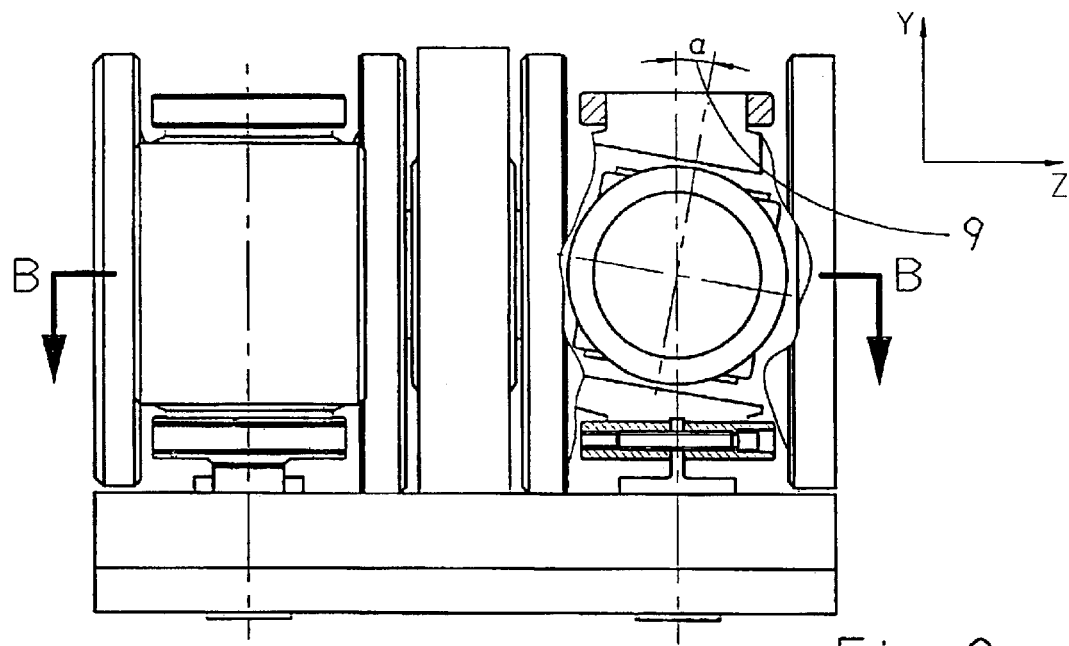
FIG. 2 is a partly broken section through the Y-Z plane.

To provide a relationship between deflection in the Y direction and the pivot angle of the friction wheels, the split bearings 3 are torsionally positioned in the carriers 4 forming a specific pivot angle α (FIG. 2) designated with 9. By means of this arrangement it is possible to achieve a stable state in every Y position of the friction wheels, forming a preset pivot angle corresponding to a specific ratio, as it results from FIG. 4. Thereby a reduction ratio can be exactly coordinated with every Y position of the friction wheels. This means also that after accomplishment of the ratio adjustment, the friction wheels do not have to be again led back to their position Y=0. Therefore, a single regulating variable is sufficient to control the ratio, that is, either the detection of the pivot angle or of the Y position.

Figure 3:
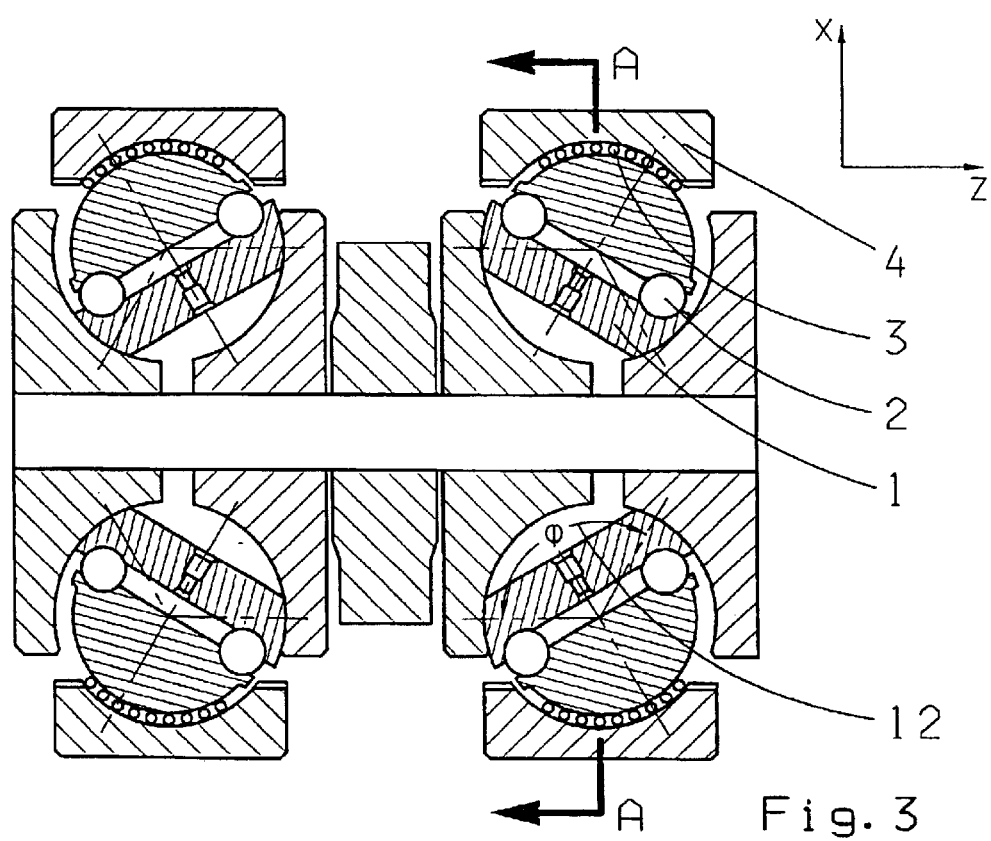
FIG. 3 is a partly broken section through the Y-Z plane.

In order to improve the load compensation between the individual power branches, the friction wheels 1 or the deflection movement thereof are mechanically coupled with each other via the lower coupling beam 7. To this end, the coupling beam 7 is axially supported at 10, by the housing for the hydraulic piston 5. This support is here designed so that the friction wheels can separately center themselves in the X direction between the input and output discs of one of each gear unit but be coupled with each other in the Y direction. The parallel-like arrangement with the axial bearing point 10, at the same time, ensures that the friction wheels, during deflection in the Y direction, move toward the preset contact point path designated with 11. Thereby it is ensured that the contact angle φ (FIG. 3), designated with 12, does not change with deflection.

FIG. 4A shows one of the friction wheels 1 in a stable state, that is, in a position Y=0, the longitudinal axis of the continuously variable gear being diagrammatically indicated with 13.

FIG. 4B shows the friction wheel 1 moved out of the stable state by the amount Y, the pivot axis of the friction wheel 1 being designated with 14.

FIG. 4C shows that the friction wheel 1 has been rotated, but is nevertheless still in an unstable state, since the axis of rotation 15 of the friction wheel 1 does not intersect the longitudinal axis 13.

FIG. 4D makes clear that the friction wheel takes a stable state, since here the axis of rotation 15 of the friction wheel 1 intersects (intersection point 16) the longitudinal axis 13.

Reference Numerals 1 friction wheel
2 axial-radial bearing
3 split bearing
4 carrier
5 hydraulic piston
6 coupling rod
7 coupling beam
8 compensation arrangement
9 pivot axis angle
10 bearing point of coupling beam
11 contact point path
12 contact angle φ
13 longitudinal axis
14 pivot axis
15 axis of rotation
16 intersection point

What is claimed is:

1. A Continuously variable friction gear comprising:

a housing;

a input shaft;

a torque shaft positioned coaxially relative to the input shaft;

a pair of input discs having toroidal inner surfaces, and the pair of input discs being disposed coaxially relative to the input shaft;

a pair of output discs having toroidal surfaces, and the pair of output discs being disposed coaxially relative to the input shaft;

the pair of output discs being disposed side by side and in mirror symmetry with one another, and each of the pair of input discs forming a drive pair with one of the pair of output discs;

a plurality of friction wheels rotatably disposed between the inner surfaces of the drive pairs of input and output discs for transmitting torque from the input disc to the appertaining output disc;

a carrier for each of the plurality of friction wheels;

a pivoting device for the carriers of the plurality of friction wheels;

a pressure arrangement for energizing one of the input discs to bias the one input disc toward the output discs to facilitate transmission of torque;

an output shaft; and a gear wheel arrangement located between the pair of output discs;

wherein each of the plurality of friction wheels (1) is rotatably supported by a combined axial radial bearing (2) which comprises of a split bearing (3) inserted in one of the carriers (4) and rotated relative to a Y axis about a present pivot angle ($\alpha$), the carriers (4) of each gear unit face one another and are interconnected by an upper coupling rod (6) and a lower coupling beam (7), and the lower coupling beam (7) is axially supported (10) by a housing for the hydraulic pistons (5).

2. The continuously variable friction gear according to claim 1, wherein the carriers (4) are connected with the upper coupling rod (6) and the lower coupling beam (7) via bearing points with rolling relative movement.

3. The continuously variable friction gear according to claim 1, wherein a compensating arrangement (8) is provided between the hydraulic piston (5) and the lower end of the appertaining carrier (4).

* * * * *